US006212557B1

(12) United States Patent
Oran

(10) Patent No.: US 6,212,557 B1
(45) Date of Patent: Apr. 3, 2001

(54) METHOD AND APPARATUS FOR SYNCHRONIZING UPGRADES IN DISTRIBUTED NETWORK DATA PROCESSING SYSTEMS

(75) Inventor: David Oran, Bloomington, IN (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/068,592

(22) Filed: May 27, 1993

Related U.S. Application Data

(63) Continuation of application No. 07/471,855, filed on Jan. 29, 1990, now abandoned.

(51) Int. Cl.⁷ .................................................. G06F 9/00
(52) U.S. Cl. .......................... 709/221; 709/220; 709/248; 717/11
(58) Field of Search .................................... 709/220, 221, 709/248, 219; 713/1, 100; 717/11

(56) References Cited

U.S. PATENT DOCUMENTS

| | | | | |
|---|---|---|---|---|
| 4,007,450 | * | 2/1977 | Haibt et al. | 364/200 |
| 4,432,657 | * | 2/1984 | Daniell et al. | 364/300 |
| 4,498,142 | * | 2/1985 | Advani et al. | 364/900 |
| 4,558,413 | * | 12/1985 | Schmidt et al. | 395/600 |
| 4,644,468 | | 2/1987 | Dostov | 364/200 |
| 4,648,036 | * | 3/1987 | Gallant | 364/300 |
| 4,710,870 | | 12/1987 | Blackwell | 364/200 |
| 4,714,992 | * | 12/1987 | Gladmey et al. | 364/200 |
| 4,747,130 | | 5/1988 | Ho | 364/200 |
| 4,769,772 | | 9/1988 | Dwyer | 364/200 |
| 4,780,821 | | 10/1988 | Crossley | 364/200 |
| 4,800,488 | | 1/1989 | Agrawal et al. | 364/200 |
| 4,819,154 | | 4/1989 | Stiffler et al. | 364/200 |
| 4,823,261 | * | 4/1989 | Bank et al. | 364/200 |
| 4,845,658 | | 7/1989 | Gifford | 364/900 |
| 4,853,843 | | 8/1989 | Ecklund | 364/200 |
| 4,864,497 | * | 9/1989 | Lowry et al. | 364/200 |
| 4,875,159 | * | 10/1989 | Cary et al. | 364/200 |
| 4,881,166 | | 11/1989 | Thompson et al. | 364/200 |
| 4,925,311 | | 5/1990 | Neches et al. | 364/200 |
| 4,937,784 | | 6/1990 | Masai | 364/900 |
| 4,961,139 | * | 10/1990 | Hong et al. | 364/200 |
| 5,008,814 | * | 4/1991 | Mathur | 395/200 |
| 5,019,963 | * | 5/1991 | Alderson et al. | 364/200 |
| 5,047,918 | * | 9/1991 | Schwartz et al. | 395/600 |
| 5,117,351 | * | 5/1992 | Miller | 395/650 |
| 5,142,681 | * | 8/1992 | Driscoll et al. | 395/700 |
| 5,155,847 | * | 10/1992 | Kirovac et al. | 395/600 |

OTHER PUBLICATIONS

"Grapevine: An Excercise in Distributed Computing", by Andrew D. Birrell, Roy Levin, Roger M. Needham, and Michael D. Schroeder, Copyright 1982, Communications of the ACM, Apr. 1982, vol. 25, No. 4.

Mockapetris et al, "A Perspective on Name System Design", Proceedings IEEE Infocom 85, Mar. 26–28, 1985.

Peterson, "A Yellow–Pages Service for a Local–Area Network", Computer Communication Review (ACW Press; Proceedings of The ACM Sigcomm '87 Workshop) Aug. 11–13, 1987.

Fleisch, "Distributed System V IPC in Locus: A Design and Implementation Retrospective" Computer Communications Review (Sigcomm 'Symp./Communications; Architectures & Protocols), Aug. 5–7, 1986.

* cited by examiner

*Primary Examiner*—Majid Banankhah
(74) *Attorney, Agent, or Firm*—Sharp, Comfort & Merrett, P.C.

(57) ABSTRACT

A method and apparatus for upgrading the naming service of a distributed network data processing system uses controlled upgrades of replicated directories in clearinghouses on a node-by-node basis.

6 Claims, 3 Drawing Sheets

METHOD AND APPARATUS FOR SYNCHRONIZING UPGRADES IN DISTRIBUTED NETWORK DATA PROCESSING SYSTEMS

This application is a continuation of application Ser. No. 07/471,855, filed Jan. 29, 1990 now abandoned.

FIELD OF THE INVENTION

The present invention relates to distributed network data processing system naming services, and more particularly to methods and apparatus for synchronizing upgrades for naming services in distributed network data processing systems.

BACKGROUND OF THE INVENTION

A digital data processing system, or computer, typically includes a processor, associated memory and input/output units enabling a user to load programs and data into the computer and obtain processed data therefrom. In the past, computers were expensive, and so to be cost effective had to support a number of users. More recently, however, the cost of computers, particularly the processors and memories, has decreased substantially, and so it is relatively cost effective to provide a computer to one or at most only a few users.

A benefit of providing only a single computer for a large number of users has been that the users can easily share information. Thus, for example, if all persons working in a bookkeeping or accounting department use a single common computer, they can maintain common accounting and bookkeeping databases up to date, and when necessary, accounting reports can be generated from those databases. However, if they use separate computers, the data is stored in separate databases, on each computer, and so generating accounting reports can be more difficult.

As a result, networks have been developed to provide a distributed computer system, that is, a system that permits diverse computers to communicate and transfer data among them. In addition, these distributed networks allow the sharing of expensive input/output devices, such as printers and mass storage devices, and input/output devices that may be rarely used, such as links to the public telecommunications network. In a distributed network, each computer is a node which communicates with other nodes over one or several wires. In addition, nodes may be provided that store and manage databases or other data files on mass storage devices, or that manage printers or links to the public telecommunications network.

A problem arises with distributed networks, however, since resources used in the distributed network, such as programs and data files, the input/output devices and so forth, are typically stored in, or connected to, only some of the nodes. If clients on other nodes need to use such resources, they must be able to find them. Each client node has had to maintain a file identifying the location, within the distributed network, of all resources that are available to the client. With a large distributed network with many resources, this arrangement requires substantial amounts of memory at each client node devoted only to the storage of such location information. In addition, maintaining location information in the diverse client nodes in an updated and current condition is difficult and requires processing by the client node and transfers over the network which could otherwise be used for more useful information processing purposes.

More recently, naming services have been developed that maintain the identification of the locations of the resources available in a network. Naming services maintain the location information in only a few locations in the network, and provide the information to a client node on request. In addition, the naming services update the location information over the network without client node processing.

In a distributed network data processing system having a naming service, the naming service is simultaneously available at many locations, or nodes, in the network. Some of these nodes are clients of the service, and others are servers. The servers are algorithms that provide the naming service to the clients. The clients are themselves algorithms which use the naming service provided by the servers in the distributed network system. The servers must all run similar or identical versions of the software that implements the naming service. When it becomes necessary or desirable to upgrade the naming service to change its behavior or add new features the software at all of the server nodes must be changed.

One prior art approach to this problem requires that all servers be taken down, reconfigured, and brought back up again. A second prior art approach performs the upgrade as an atomic action using a multi-phase commitment protocol. Because it is rarely feasible to shut down all of the servers simultaneously to install new software, the first approach is undesirable. In the second approach, the multi-phase commitment protocol has several disadvantages, such as locking out client access while in execution and requiring that at least a majority of the replicas of any replicated piece of the system be brought up simultaneously. This protocol is also limited in application because it cannot scale very large systems.

Each name that is processed by the naming service of a distributed network processing system denotes a single, unique object. Names for objects are recorded in directories, which themselves have names. A directory contains entries comprising both object entries and child pointer entries. An object entry consists of the object's name and a set of attributes for the object, most prominent of which is the network address where the object currently resides. Child pointer entries link the directories together into a rooted tree, in which there is a single path from the root directory through a set of child directories, to the desired named object.

A tree of directories, starting at a root, is called a namespace. A namespace is stored in a partitioned, partially replicated database. The database is partitioned because parts of the namespace are stored in different locations. The database is partially replicated because part of the namespace may be simultaneously stored in multiple locations. The directory is a unit for the purposes of both partitioning and replication. A collection of copies of directories stored on a particular node is called a clearinghouse. The partitioning is accomplished by controlling which directories are stored in which clearinghouses. The replication is accomplished by storing a directory in more than one clearinghouse.

Clearinghouses are either "up" or "down". When a clearinghouse is "up" at a given node, that node is acting as a nameserver. A nameserver can be controlling more than one clearinghouse simultaneously, especially when the failure of one nameserver has resulted in a clearinghouse "moving" to a new nameserver.

A copy of a directory stored in a particular clearinghouse is called a replica. In order to simplify the algorithms for name creation and general namespace maintenance, one of the replicas of a directory is designated to be the master replica for that directory. Creation of new child pointer entries is permitted only through the master replica for the parent directory. Creation of object entries, in addition to any update or deletion, may be directed to another kind of replica storing the appropriate directory, called a secondary replica. A third kind of replica, the read-only replica, only responds to lookup requests and is not permitted to perform creations, updates, or deletions on behalf of clients.

The naming service maintains a distributed database on behalf of its clients. This database does not have the usual characteristics of a distributed database since it provides very loose consistency guarantees to allow high levels of partitioning and replication. A client may get different answers depending on which replica of a directory is queried if updates are still being propagated through the system.

Updates to a namespace are timestamped and applied such that the update with the latest timestamp wins. The updating algorithms are designed such that all updates are "total". This means that an update is always applied irrespective of the history of past updates. The updates are also "idempotent", meaning that multiple applications of an update to the database have the same effect as a single application of the update. Finally, the updates are "commutative", meaning that the updates are applied in any order with identical results.

The primary algorithm for producing convergence among the replicas of a directory is called the skulker. The skulker operates independently on each directory in a namespace. The skulking operation ensures that all replicas of a directory have absorbed all updates applied to any replica prior to the time the skulk started. The more frequently that skulks are run, the more up-to-date all replicas of a directory are maintained.

Each skulking operation gathers up all updates made to all of the replicas since the last skulk and applies them to the clearinghouse where the skulk is running. Each skulk also spreads all the gathered updates to all replicas of the directory. Finally, each skulk informs all replicas of the timestamp of the latest update all of them are guaranteed to have seen. This timestamp is known as the "AllUpTo" value of the directory.

SUMMARY OF THE INVENTION

The present invention overcomes the problems of the prior art upgrading procedures for naming services with a method of upgrading that permits the server software to be changed one server at a time, to allow the new naming features of the naming service to be introduced in a controlled fashion, and to perform the upgrade while other operations are in progress while accounting for the replicated nature of the directories. The method according to the present invention accomplishes this by comparing attributes representing the version of the replicas in each clearinghouse operating on a nameserver with another attribute representing the version that the directory is to be upgraded to. Another attribute represents when all the subject replicas are upgraded. In this way, each clearinghouse may be upgraded by the nameserver on which it operates without taking down the rest of the distributed network system.

DETAILED DESCRIPTION OF THE INVENTION

Figure 1:
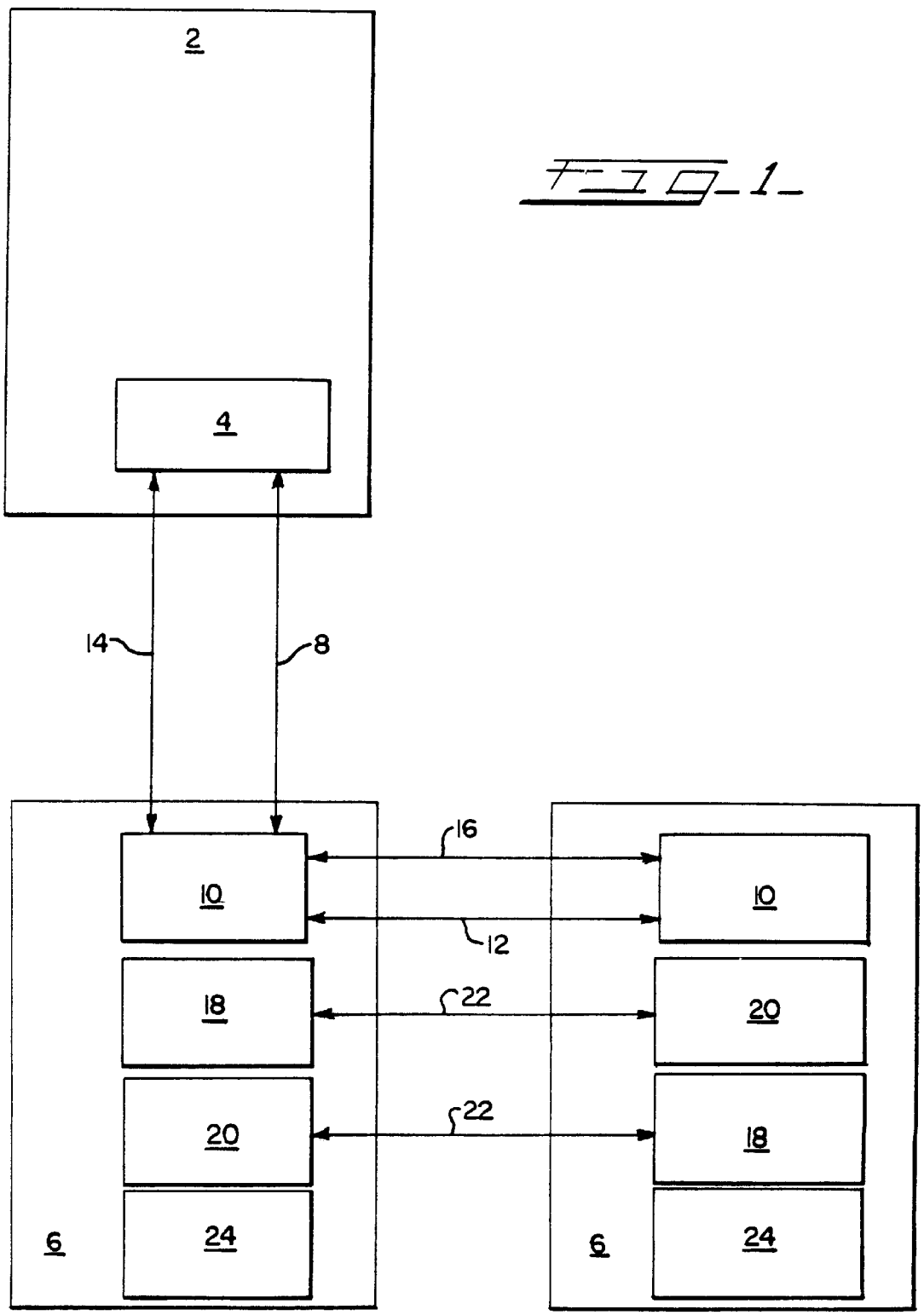
FIG. 1 is a block diagram of a naming service architecture in a distributed network system suitable for incorporating the present invention.

The present invention can be incorporated into a naming service for a distributed network data processing system with a naming service architecture such as shown in FIG. 1. The naming service is functionally divided into a number of major modules that reside in client nodes and nameserver nodes. A naming service client 2 accesses the naming service through a client interface provided by a naming service module comprising a clerk 4. The clerk 4 ascertains the appropriate one of a plurality of nameservers 6 in the naming service to process a request from the client 2.

For purposes of illustration, two of the nameservers 6 are shown with one of the clerks 4 in FIG. 1, although the distributed network system will typically have many more of the clerks 4 and nameservers 6 in its naming service, as will be appreciated by those skilled in the art. The clerk 4 invokes a Clerk-Server Protocol, represented by a communication path 8, to a transaction agent module 10 in one of the nameservers 6 to speak to as many of the nameservers 6 as necessary to satisfy the request.

The nameservers 6 transfer the Clerk-Server Protocol from the clerk 4 among themselves as required, represented by a communication path 12 between their respective transaction agent modules 10. The clerk 4 is responsible for learning about at least one of the nameservers 6 that can either process a request from the client 2 or provide information about the other nameservers 6 that can be useful. This initial information is obtained via a Solicitation and Advertisement Protocol invoked by the clerk 4, represented by a communication path 14, to the transaction agent module 10 of one of the nameservers 6. The nameservers 6 periodically advertise their availability, which is communicated via this protocol.

The nameservers 6 comprise four modules, including the transaction agent module 10. The transaction agent module 10 processes the nameserver side of the Clerk-Server Protocol, performing operations requested by the clerk 4. It accesses clearinghouses and performs creations, updates, deletions, and lookups as specified by the clerk 4. It causes modifications for an entry to be propagated to all replicas of the directory when a change is made. The transaction agent module 10 is also responsible for coordinating the creation, deletion, and modification of directories using a Directory Maintenance Protocol between the transaction agent modules 10 of the nameservers 6, represented by a communication path 16 between the transaction agent modules 10 of the nameservers 6.

Each of the nameservers 6 also have an update sender module 18 and an update listener module 20. The update sender module 18 is responsible for propagating any changes made by the corresponding transaction agent module 10 to all clearinghouses that need to know about the change. The update listener module 20 receives updates sent by the update sender module 18 with an Update Propagation Protocol, represented by a communication path 22 between the update sender module 18 and the update listener module 20.

The update sender module 18 and the update listener module 20 are also responsible for ensuring that clearinghouses can find each other when a new clearinghouse is created or if a clearinghouse moves. This is accomplished by clearinghouses modifying their own registration information in the namespace and by maintaining appropriate pointers such that the root of the namespace may be found by starting any clearinghouse in the namespace.

A nameserver control module 24 in each of the nameservers 6 provides the management interface and coordinates the overall operation of its nameserver 6. The nameserver control module 24 turns its nameserver 6 on and off, brings clearinghouses on and off line and is also responsible for advertising the availability of its nameserver 6 to the clerk 4 if it is listening.

The client 2, nameservers 6, and the various modules thereof described above, comprising the clerk 4, the transaction agent modules 10, the update sender modules 18, the update listener modules 20 and the nameserver control modules 24 are shown only in block form because they are well known elements that do not in themselves form part of the present invention.

Figure 2:
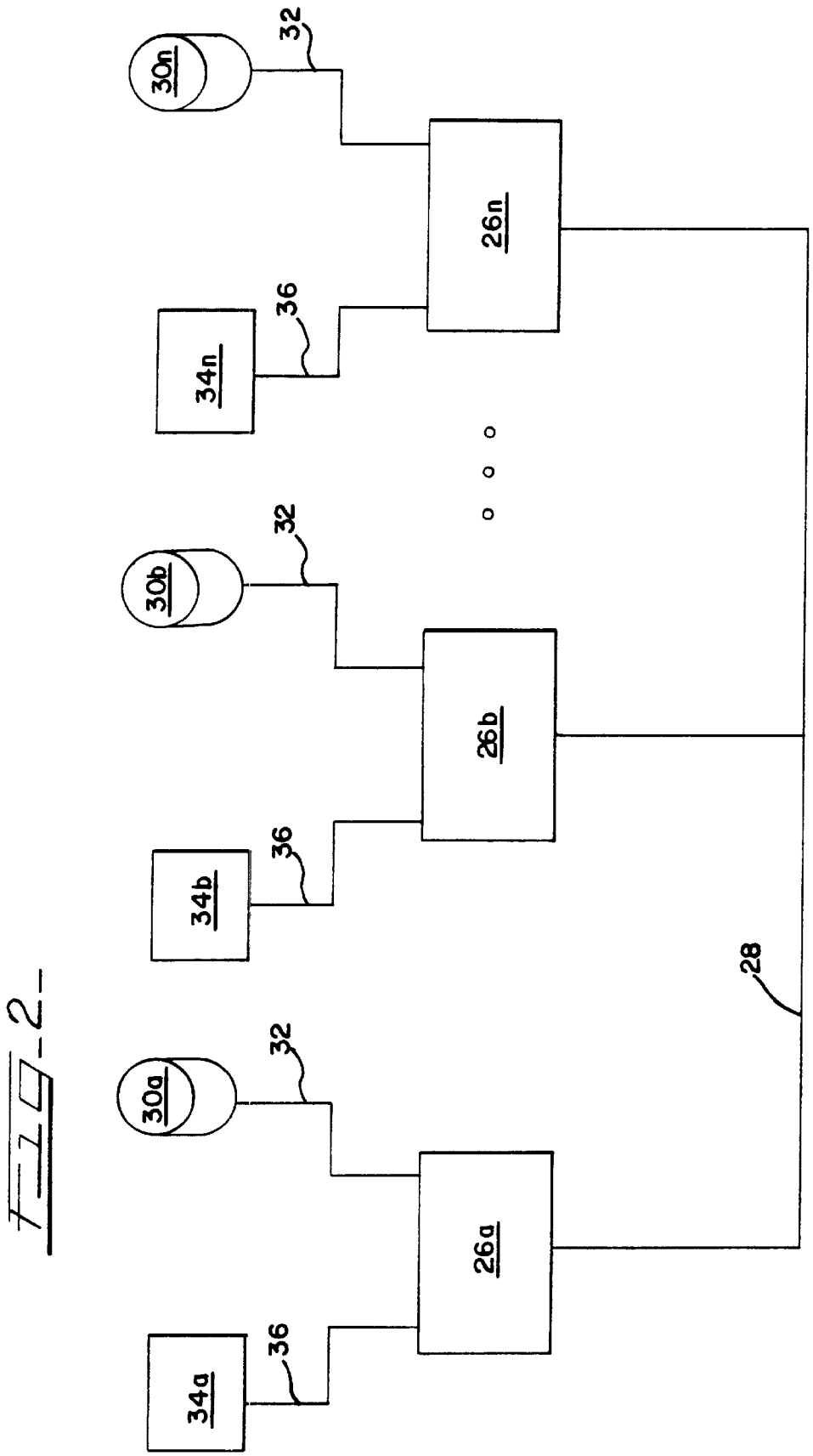
FIG. 2 is a block diagram of a distributed network system suitable for incorporating the naming service architecture shown in FIG. 1.

FIG. 2 shows a typical configuration for a distributed network system in which the naming service described above is employed. The system includes a plurality of independent data processing units 26 that are linked together via at least one communication data link or path. In FIG. 2, three of the data processing units 26, represented as the data processing units 26a, 26b and 26n, are shown coupled together with via a single communication data link 28, although the system may employ at least two, but more than three of the data processing units 26. Likewise, the data processing units 26 may be coupled together by more than one of the communication data links 28.

Each of the data processing units 26 also has at least one associated memory unit 30 coupled to each of the data processing units via a memory data link 32. In FIG. 2, three of the memory units 30, represented as the memory units 30a, 30b and 30n, are shown. Each of the data processing units 26 also has at least one input/output unit 34 coupled to each of the data processing units 26 via an input/output data link 36. In FIG. 2, three of the input/output units 34, represented as the input/output units 34a, 34b and 34n, are shown. The above-described data processing units 26, the memory units 30 and the input/output devices 36 are all shown in block form in FIG. 2, because they are well known elements of distributed network systems that do not individually constitute the present invention.

The present invention upgrades the naming service provided by nameservers in a distributed network data processing system by operating solely on the nameservers and adding three new single valued attributes, comprising two directory attributes and one replica attribute. These new attributes have timestamps and states in non-volatile storage that are part of the directories themselves. Because of this, any nameservers can "crash" during the upgrade process without having to restart the process from the beginning.

By operating solely on the nameservers, the clerks are not involved in the upgrade process. In this way, the clerks are not relied upon to maintain permanent states and they do not enforce any invariants of the namespace. Also, the inter-version compatibility between the clerks and the nameservers can remain explicitly addressed in the protocol version rules already present in the distributed network system. Where necessary, upon detecting a version skew between clerk and nameserver, the party using the higher version can perform any necessary data-type or function transformations.

The present invention also upgrades namespaces on a directory-by-directory basis, since there can be so many nameservers. Also, the directories can be upgraded in any order because the mapping of replicas is essentially arbitrary. According to the present invention, upgrades need only represent a change in directory version from an earlier version to a later version. The changes may comprise a deletion or addition of features.

The first directory attribute, designated "DirectoryVersion", has a value that indicates the current version of the directory. All replicas of the directory have the same data structures, algorithms, and invariants. Each clearinghouse storing a replica of this directory must reside on a nameserver running a version of the naming service with a version number that is greater than or equal to the version number indicated by the DirectoryVersion attribute. Absence of the DirectoryVersion attribute is defined to be the equivalent of its presence with a value of 1. In this way, any attempt to bring up a clearinghouse on a nameserver whose designated software is a version less than the DirectoryVersion attribute fails.

The replica attribute, designated "ReplicaVersion", has a value that indicates the current version of a particular replica of a directory. This attribute is used to check for when all replicas of a given directory are capable of operating with a version indicated by the value of the ReplicaVersion attribute after a commit point. The commit point represents the point in time when all replicas of a given directory are capable of operating with a new directory version. Once a replica has started operating at a version "n+1", may not be subsequently "rolled back" to version "n", even if the upgrade procedure is terminated. This is to accommodate non-reversible changes in invariants or data structures in an organized fashion. The absence of this attribute is defined to be the equivalent of having the ReplicaVersion attribute with a value of 1.

The second directory attribute, designated "UpgradeTo", has a value that indicates the desired new version of a directory. It is explicitly set by the client to cause the upgrade process to be initiated. This attribute is removed upon completion of the distributed network system upgrade. The value of the UpgradeTo attribute should be greater than or equal to the value of the DirectoryVersion attribute to be meaningful.

If the value of the UpgradeTo attribute is less than the value of the DirectoryVersion attribute, the UpgradeTo attribute is ignored, and it is removed, since downgrading of a directory is not supported. This upgrade procedure may be aborted by deleting this attribute at any time prior to that defined by the commit point. As explained above, the commit point represents the point in time when all replicas of a given directory are capable of operating with the version indicated by the value of the UpgradeTo attribute.

In order to initiate an upgrade for all replicas of a directory from a version "n" to a version "n+1", it is necessary for the following invariants to remain true before, during and after the upgrade process. The value of the DirectoryVersion attribute must be less than or equal to the value of the UpgradeTo attribute. Also, the value of the DirectoryVersion attribute must be less than or equal to the minimum value of the ReplicaVersion attribute for any of the replicas. Finally, the value of the ReplicaVersion attribute for all replicas must be less than or equal to the version of the nameserver on which the clearinghouse is operating.

In addition to the above conditions, the following preconditions to any directory upgrade from the version "n" to the version "n+1" throughout the distributed data network must also be true. The various attributes all have timestamps that indicate their status at the time represented by their respective timestamps. Each directory has an attribute, designated "AllUpTo", that represents a timestamp value corresponding to the time when all updates to the directory have been propagated everywhere in the system, and everything in the system that is older than that value has been synchronized.

The directory to be upgraded must be represented by the DirectoryVersion attribute with a value of "n" and a timestamp less than that of the AllUpTo attribute. Also, if the UpgradeTo attribute is present at all, it must have a value that is greater than or equal to "n" and a timestamp also less than that for the AllUpTo attribute. Furthermore, the ReplicaVersion attribute must have a value equal to "n" for all replicas. Finally, all affected nameservers must have a software version greater than or equal to "n".

The following conditions must hold true after the upgrade occurs. The directory upgraded must be represented by the DirectoryVersion attribute with a value of "n+1". If the UpgradeTo attribute is present at all, it should have a value of "n+1". Furthermore, all replicas of the upgraded directory should be represented by the ReplicaVersion attribute having a value of "n+1". Finally, all affected nameservers must have a software version that is greater than or equal to "n+1".

Figure 3:
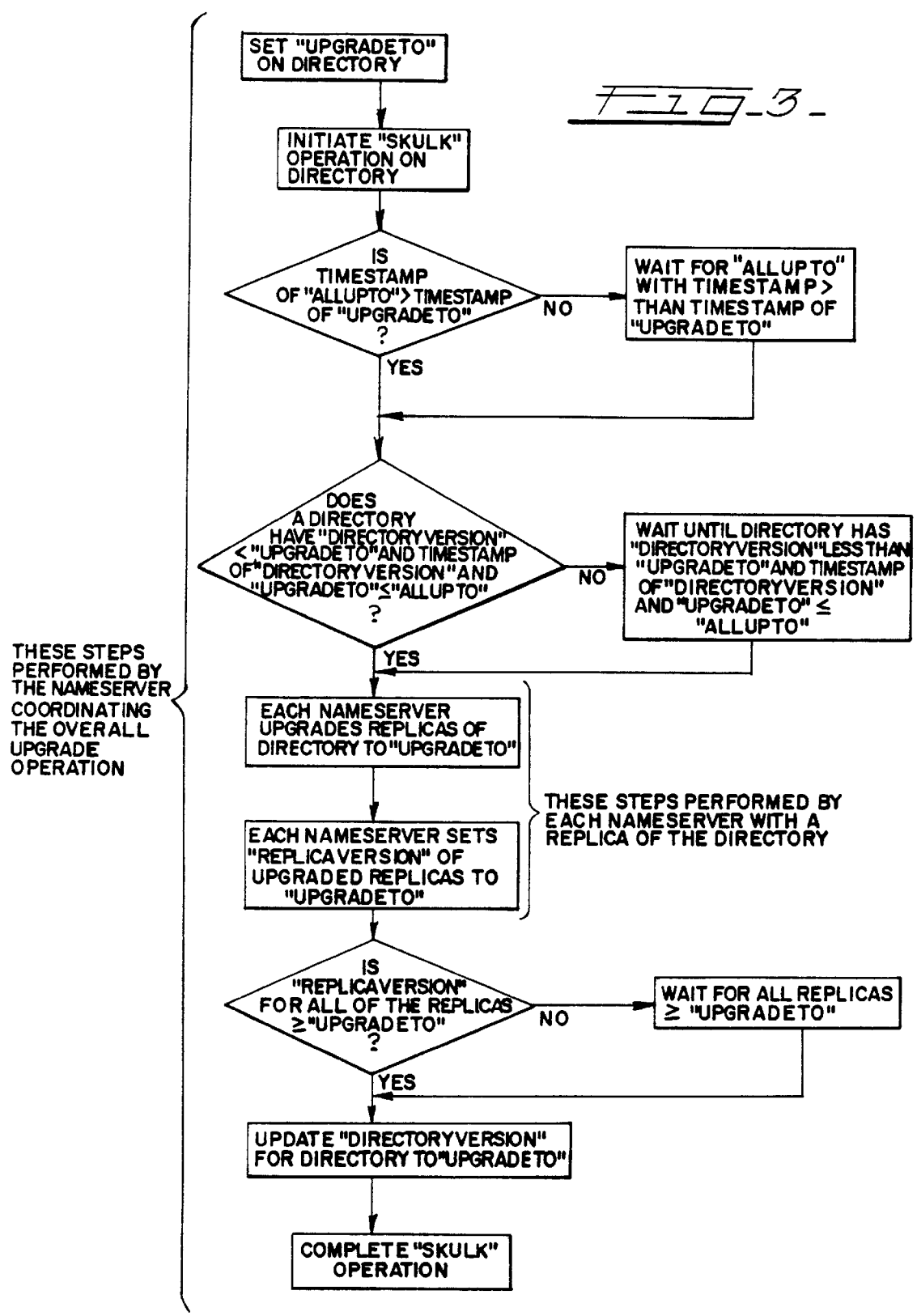
FIG. 3 is a flow chart of upgrading operations according to the present invention.

FIG. 3 is a flow chart that summarizes the upgrading operations of the present invention as described below. To commence the upgrade process of a directory of version "n" to "n+1", the value of the UpgradeTo attribute is set to "n+1" by the one of the nameservers that coordinates the overall upgrade operation. This operation is performed by each data processing unit associated with the coordinating nameserver. The values of the UpgradeTo attribute and the DirectoryVersion attribute are stored in a memory unit associated with the coordinating nameserver. This memory unit is most advantageously of the non-volatile type, such as a disc drive, so that a "crash" of the coordinating nameserver does not force the update process to restart from the beginning. Then an operation to cause all copies of the distributed data network to be updated is initiated by the data processing unit associated with the coordinating nameserver. This can be a "skulk" operation such as described above, as well as in the U.S. patent application Ser. No. 093,882, entitled "Distributed Naming Service for Distributed Networks", by Oran filed on Sep. 8, 1987, and incorporated herein by reference.

After the skulk is initiated, the timestamp of the AllUpto attribute is compared to that of the UpgradeTo attribute by the data processing unit associated with the coordinating nameserver. The AllUpTo attribute must have a time stamp greater than the time stamp of the UpgradeTo attribute to take further action so that all replicas of the directory to be upgraded have an opportunity to receive the upgrade request.

Each replica of the directory is then upgraded to the version indicated by the UpgradeTo attribute by each of the nameservers with a replica of the directory, if the UpgradeTo attribute is less than or equal to the version of the nameserver software. This operation is performed by each data processing unit associated with each of these nameservers. The upgrade continues with data-type conversions, any necessary new invariant checks, and any version-specific upgrade algorithm by the associated processing units. If it is not possible to so continue the upgrade, this condition can be transmitted to the user via associated communication data links. The ReplicaVersion attribute is then set to equal the UpgradeTo attribute by the associated data processing units. The value of the ReplicaVersion attribute is stored in a memory unit associated with each nameserver with a replica of the directory. As with the case of the UpgradeTo attribute, the memory unit storing each ReplicaVersion attribute value is most advantageously of the non-volatile type, such as a disc drive, so that a "crash" of the associated nameservers does not force the update process to restart from the beginning. If the UpgradeTo attribute is greater than the version of the replica defined by the nameserver, this condition can be transmitted to the user via the associated communication data links and the upgrade process is delayed.

During all skulks, if the value of the UpgradeTo attribute is greater than the DirectoryVersion attribute and the timestamp of the UpgradeTo attribute is less than the timestamp of the AllUpTo attribute, the overall upgrade process is attempted in the following manner. During the skulk operation, the ReplicaVersion attribute for each replica is read. This operation is performed by each data processing unit associated with each of the nameservers having a replica. A minimum replica version number, designated minVersion, is set to have a value corresponding to the minimum value of the ReplicaVersion attribute for any of the replicas by these data processing units. If the value of minVersion is greater than or equal to the UpgradeTo attribute, then the DirectoryVersion attribute is updated to "n+1" by these data processing units. This new update is then propagated to all replicas of the directory with the skulking operation via the associated communication links, and the upgrade procedure is completed in the normal fashion.

It is necessary to prevent a new replica from being added during the skulk operation while the value of minVersion is being determined and the new replica is on a nameserver whose version number is less than the value of the UpgradeTo attribute. Otherwise it is possible for the commit point to be passed with the new replica allowed into the replica set of the directory.

Addition of such replicas is prevented by comparing the ReplicaVersion attribute of the replica to be added to the ReplicaVersion attribute of each replica of the directory. This operation is performed by each data processing unit associated with each of the nameservers having a replica. If the ReplicaVersion attribute of the newly added replica is greater than or equal to the master replica, the new replica is added and its version is used in future computations and data storage.

Thus there has been described herein a method and apparatus for synchronizing the upgrading of replicas of directories in a naming service for a distributed network data processing system that permits the naming service software to be upgraded on a node-by-node basis and allows new features to be turned on in a controlled fashion without having to take down any part of the naming service or have the clients suffer any outages while the naming service is being upgraded. It will be understood that various changes in the details and the arrangements of the processes that have been described herein in order to explain the nature of the invention may be made by those skilled in the art within the principle and scope of the present invention as expressed in the appended claims.

What is claimed is:

1. A method of systematically updating information in a distributed network data processing system, said data network having at least one client node, at least one server node operating in conjunction with said client node, a plurality of directories, at least one clearinghouse replica of each of said directories, each of said clearinghouse replicas residing on said server node, and a synchronization attribute for each directory, said synchronization attribute having a synchronization attribute timestamp, said method comprising the steps of:

assigning a replica attribute having a replica attribute timestamp and a replica attribute value to each clearinghouse replica of each of said directories;

assigning a first directory attribute having a first directory attribute timestamp and a first directory attribute value indicative of an existing version of said directory to each of said directories;

assigning a second directory attribute having a second directory attribute timestamp and a second directory attribute value being indicative of an upgraded version of said directory to each of said directories;

maintaining each said clearinghouse replica of each of said directories on said data processing system;

systematically comparing each said replica attribute value for each said clearinghouse replica with said second directory attribute value for each of said directories;

systematically comparing each said first directory attribute timestamp for each of said directories and said second directory attribute timestamp for each of said directories to said synchronization attribute timestamp;

systematically replacing each said clearinghouse replica of each of said directories with said upgraded version of said directory when said comparison of said replica attribute value and said second directory attribute value indicates that said second directory attribute value is a more recent version of said directory than said clearinghouse replica and said comparison of said first directory attribute timestamp and said second directory attribute timestamp to said synchronization attribute timestamp indicates that said synchronization attribute timestamp is more recent than said first directory attribute timestamp and said second directory attribute timestamp;

synchronizing each said clearinghouse replica on said data processing system by periodically propagating each said clearinghouse replica throughout said data processing system; and modifying said synchronization attribute timestamp for each of said directories to represent a time at which said periodic propagation of said clearinghouse replica last occurred.

2. The method recited in claim 1, wherein said step of assigning said replica attribute and said steps of assigning said directory attributes each comprise the step of storing the values of said respective attributes in non-volatile storage.

3. The method recited in claim 1, further comprising the step of isolating said client node from the process of updating said clearinghouse replicas.

4. An apparatus for systematically updating information in a distributed network data processing system, said data network having at least one client node, at least one server node operating in conjunction with said client node, a plurality of directories, at least one clearinghouse replica of each of said directories, each of said clearinghouse replicas residing on said server node, and a synchronization attribute for each directory, said synchronization attribute having a synchronization attribute timestamp, comprising:

means for assigning a replica attribute having a replica attribute timestamp and a replica attribute value to each clearinghouse replica of each of said directories;

means for assigning a first directory attribute having a first directory attribute timestamp and a first directory attribute value indicative of an existing version of said directory to each of said directories;

means for assigning a second directory attribute having a second directory attribute timestamp and a second directory attribute value indicative of an upgraded version of said directory to each of said directories;

means for maintaining each said clearinghouse replica of each of said directories on said data processing system;

means for systematically comparing each said replica attribute value for each said clearinghouse replica with said second directory attribute value for each of said directories;

means for systematically comparing each said first directory attribute timestamp for each of said directories and said second directory attribute timestamp for each of said directories to said synchronization attribute timestamp;

means for systematically replacing each said clearinghouse replica of each of said directories with said upgraded version of said directory when said comparison of said replica attribute value and said second directory attribute value indicates that said second directory attribute value is a more recent version of said directory than said clearinghouse replica and said comparison of said first directory attribute timestamp and said second directory attribute timestamp to said synchronization attribute timestamp indicates that said synchronization attribute timestamp is more recent than said first directory attribute timestamp and said second directory attribute timestamp;

means for synchronizing each of said clearinghouse replicas on said data processing system by periodically propagating said clearinghouse replicas throughout said data processing system; and means for modifying said synchronization attribute timestamp to represent a time at which said periodic propagation of said clearinghouse replicas last occurred.

5. The apparatus of claim 4, further comprising:

means for reassigning said first directory attribute value of each of said directories to equal said second directory attribute value; and means for reassigning the value of said replica attribute to equal said second directory attribute value.

6. The method recited in claim 1, further comprising the steps of:

reassigning the value of said first directory attribute of each of said directories to the value of said second directory attribute; and reassigning the value of said replica attribute to the value of said second directory attribute.

* * * * *